(12) United States Patent
Zhang et al.

(10) Patent No.: US 12,436,883 B2
(45) Date of Patent: *Oct. 7, 2025

(54) METHOD AND DEVICE FOR DATA STORAGE

(71) Applicant: SAMSUNG ELECTRONICS CO., LTD., Suwon-si (KR)

(72) Inventors: Yuqi Zhang, Suwon-si (KR); Yanlong Yang, Suwon-si (KR); Lei Geng, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,955

(22) Filed: Feb. 14, 2024

(65) Prior Publication Data

US 2024/0264935 A1     Aug. 8, 2024

Related U.S. Application Data

(63) Continuation of application No. 17/994,137, filed on Nov. 25, 2022, now Pat. No. 11,921,629.

(30) Foreign Application Priority Data

Sep. 30, 2022   (CN) .......................... 202211211847.5

(51) Int. Cl.
*G06F 16/00*     (2019.01)
*G06F 12/02*     (2006.01)
(Continued)

(52) U.S. Cl.
CPC ........ *G06F 12/0253* (2013.01); *G06F 16/125* (2019.01); *G06F 16/2246* (2019.01)

(58) Field of Classification Search
None
See application file for complete search history.

(56) References Cited

U.S. PATENT DOCUMENTS 9,400,816 B1    7/2016   Gubarev et al.
10,089,017 B2   10/2018  Huang et al.
(Continued)

FOREIGN PATENT DOCUMENTS

CN    108196792    6/2018

OTHER PUBLICATIONS

Extended European Search Report in European Appln No. 22210119.8, mailed on Aug. 21, 2023, 9 pages.

*Primary Examiner* — Anhtai V Tran
(74) *Attorney, Agent, or Firm* — Fish & Richardson P.C.

(57) ABSTRACT

A method for data storage includes determining an expected expiration time of a new data file based on attribute information of the new data file and recorded attribute information of data files, in response to creation of the new data file in a level of a Log-Structured Merge Tree (LSM-Tree). Additionally, a block set corresponding to the expected expiration time is allocated for the new data file in a storage device. The recorded attribute information of the data files indicates a level where each of the data files is located, key information of each of the data files, and lifetime information of each of the data files. The data files that have been created comprise unexpired data files or both unexpired data files, and expired data files that expired within a preset period before creation time of the new data file.

20 Claims, 9 Drawing Sheets

(51) Int. Cl.
*G06F 16/11* (2019.01)
*G06F 16/22* (2019.01)

(56) References Cited

U.S. PATENT DOCUMENTS

| | | | |
|---|---|---|---|
| 10,168,917 B2 | 1/2019 | Dai et al. | |
| 2016/0188227 A1 | 6/2016 | Yang et al. | |
| 2018/0089244 A1* | 3/2018 | Velayudhan Pillai | G06F 16/23 |
| 2019/0129844 A1 | 5/2019 | Zhang et al. | |
| 2020/0097215 A1* | 3/2020 | Bazarsky | G06F 3/0649 |
| 2021/0011623 A1* | 1/2021 | Fay | G06F 3/0658 |
| 2021/0382863 A1* | 12/2021 | Munipalle | G06F 16/2246 |
| 2022/0156231 A1 | 5/2022 | Wang et al. | |
| 2023/0079486 A1* | 3/2023 | Yarlagadda | G06F 3/0608 |
| | | | 707/694 |

\* cited by examiner

METHOD AND DEVICE FOR DATA STORAGE

CROSS-REFERENCE TO RELATED APPLICATION

This application is a continuation of U.S. application Ser. No. 17/994,137, filed Nov. 25, 2022, which is based on and claims priority under 35 U.S.C. § 119 to Chinese Patent Application No. 202211211847.5, filed on Sep. 30, 2022, in the Chinese Patent Office, the disclosure of which is incorporated by reference herein in its entirety.

TECHNICAL FIELD

The present disclosure generally relates to a technical field for data storage and, more particularly, relates to a method and device for data storage.

BACKGROUND ART

For a block storage device (e.g., a Solid State Drive (SSD)), Garbage Collection (GC) performance of a system is an indicator that requires extra consideration.

During the GC, garbage data (invalid pages) in a source block is discarded and useful data (valid pages) in the source block are migrated to a target block.

Since the data is stored into blocks without considering expected expiration time of the data, there may be a small number of invalid pages and a large number of valid pages in the source block. During the GC, migration of more valid pages increases Write Amplification, thereby resulting in a poor GC performance.

Therefore, there is an urgent need for a method and device for data storage capable of reducing the Write Amplification of the block storage device to improve the GC performance.

SUMMARY

The present disclosure may provide a method and device for data storage capable of reducing Write Amplification of a block storage device and improving GC performance of a system. The method and device may reduce the number of valid pages migrated during the GC by storing data with similar expiration times into the same block set, thereby reducing a Write Amplification Factor (WAF) to increase a lifetime of the block storage device and improve storage performance of the storage device.

According to an aspect of an exemplary embodiment of the present disclosure, a method for data storage includes: determining an expected expiration time of a new data file based on attribute information of the new data file and recorded attribute information of data files, in response to creation of the new data file in a level of a log-structured merge tree (LSM-Tree); and allocating a block set corresponding to the expected expiration time in a storage device for the new data file. The recorded attribute information of the data files includes attribute information of data files that have been created in a level of the LSM-Tree, and the attribute information indicates information of a level where each of the data files that have been created is located, key information of each of the data files, and lifetime information of each of the data files. The data files that have been created include unexpired data files, or, both unexpired data files and expired data files that expired within a preset period before creation time of the new data file. The indicated lifetime information of an unexpired data file is represented by a creation time and an expected expiration time of the unexpired file. The indicated lifetime information of an expired data file is represented by recorded lifetime information of the expired data file, or both a deletion time and a creation time of the expired data file.

According to the exemplary embodiment of the present disclosure, since a lifetime of a data file is related to a lifetime of a file created before the data file is created, an expected expiration time of a created new data file predicted based on attribute information of data files that have been created is more in line with an actual expiration time value of the new data file. Data with similar expiration times may be stored in the same block set as much as possible by selecting a storage block set based on the predicted expected expiration time. In this case, a migration of valid pages may be reduced during GC.

Since lifetimes of data files in the same level and lifetimes of data files of the adjacent levels are strongly correlated, the expected expiration time of the new data file predicted based on lifetime information of data files in the same level as that of the new data file and/or a level adjacent to that of the new data file is more in line with an actual expiration time of the new data file, which allows data with similar expiration times to be stored in the same block set, thereby reducing the migration of valid pages during GC.

Since lifetimes of adjacent data files in the same level and lifetimes of data files with overlapping keys of adjacent levels are strongly correlated, the expected expiration time of the new data file predicted based on lifetime information of data files adjacent to the new data file in the same level as that of the new data file and/or lifetime information of a data file whose key overlaps with key of the new data file of a level adjacent to that of the new data file is more in line with the actual expiration time of the new data file, which may allow data with similar expiration times to be stored in the same block set, thereby reducing a migration of valid pages during GC.

According to another aspect of an exemplary embodiment of the present disclosure, a device for data storage includes a determination unit configured to determine an expected expiration time of a new data file based on attribute information of the new data file and recorded attribute information of data files, in response to creation of the new data file in a level of a log-structured merge tree (LSM-Tree); and an allocation unit configured to allocate a block set corresponding to the expected expiration time in a storage device to the new data file. The recorded attribute information of the data files includes attribute information of data files that have been created in a level of the LSM-Tree indicating information of a level where each of the data files that have been created is located, key information of each of the data files, and lifetime information of each of the data files. The data files that have been created include unexpired data files, or, both unexpired data files and expired data files that expired within a preset period before creation time of the new data file. The indicated lifetime information of an unexpired data file is represented by a creation time and an expected expiration time of the unexpired file. The indicated lifetime information of an expired data file is represented by recorded lifetime information of the expired data file, or, both a deletion time and a creation time of the expired data file.

According to another aspect of an exemplary embodiment of the present disclosure, a system to which a storage device is applied includes a main processor, a memory, and a storage device. The memory stores a computer program for the main processor to execute the method for data storage as described above.

According to another aspect of an exemplary embodiment of the present disclosure, a host storage system includes a host and a storage device. The host is configured to perform the method for data storage as described above.

According to another aspect of an exemplary embodiment of the present disclosure, a Universal Flash Storage (UFS) system includes a UFS host, a UFS device, and a UFS interface used for a communication between the UFS host and the UFS device. The UFS host is configured to perform the method for data storage as described above.

According to another aspect of an exemplary embodiment of the present disclosure, a data center system includes a plurality of application servers and a plurality of storage servers. Each storage server includes a storage device. At least one of the plurality of application servers and the plurality of storage servers is configured to perform the method for data storage as described above.

According to another aspect of an exemplary embodiment of the present disclosure, a computer-readable storage medium stores a computer program that when executed by a processor implements the method for data storage as described above.

According to another aspect of an exemplary embodiment of the present disclosure, an electronic device for data storage includes a processor and a memory storing a computer program that when executed by the processor implements the method for data storage as described above.

BRIEF DESCRIPTION OF THE DRAWINGS

The above and other purposes and features of the exemplary embodiments of the present disclosure will become more apparent from the following description, taken in conjunction with the accompanying drawings schematically illustrating the embodiments, in which.

DETAILED DESCRIPTION OF EXEMPLARY EMBODIMENTS

According to a data storage process based on a log-structured merge-(LSM) Tree in the related art, when a database application creates a new data file in a level of the LSM-Tree, a block set identification (ID) is allocated to the created new data file through a file system, so that data in the created new data file is stored into a block set corresponding to the allocated block set ID.

The creation of a new data file could be achieved by creating a data file that is written in an LSM-Tree database for the first time, recreating a data file by an upper layer modifying a written data file in the LSM-Tree database, or writing a data file to a next level through a compaction to create the data file in the next level.

Since an expected expiration time of the new data file and expected expiration times of the existing data files in block sets are not considered when a block set ID is allocated to a created new data file, storing data files with similar expiration times in the same block set is not possible, which may lead to a migration of a large number of valid pages during GC, thereby increasing Write Amplification and reducing GC performance.

The inventors found that, according to a compaction mechanism of the LSM-Tree database, a lifetime of a data file is related to lifetimes of data files (including an expired data file and an unexpired data file) created before the data file is created.

Figure 1:
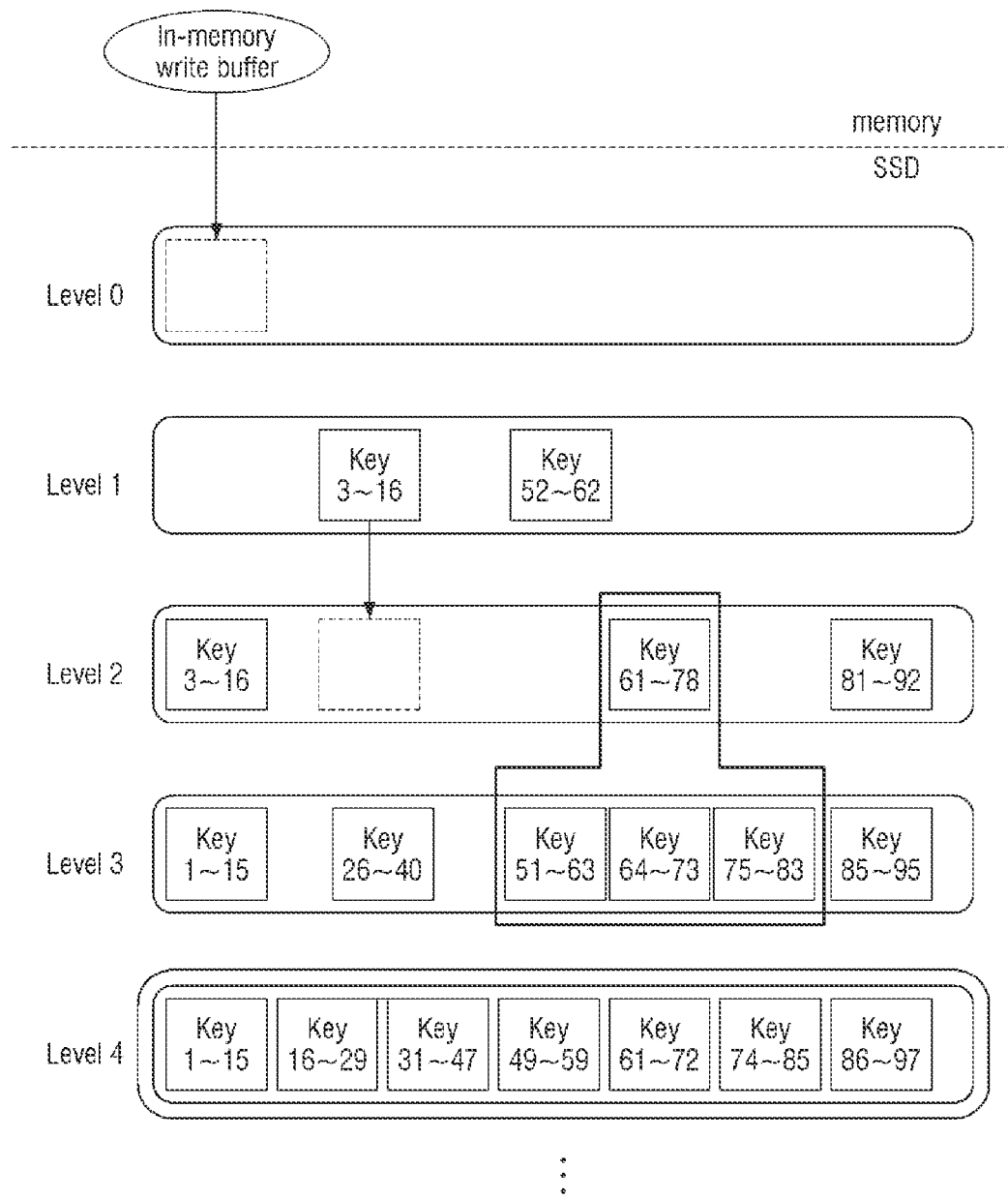
FIG. 1 is a schematic diagram illustrating a relationship among lifetimes of data files of different levels of an LSM-Tree.

FIG. 1 is a schematic diagram illustrating a relationship among lifetimes of data files of different levels of the LSM-Tree.

Referring to FIG. 1, for the N−1th level, the Nth level and the N+1th level, the association relationship among lifetimes of data files of the three levels may include the following three aspects:

1) The degree to which the key of a data file of the Nth level overlaps with the key of the data file of the N+1th level may affect the lifetime of the data file of the Nth level. For example, the data file in the Nth level whose key does not overlap with the keys of N+1th level may be moved to the N+1th level. For example, the data file with a key range of 3-16 in the first level is moved to the second level. In addition, when a compaction operation is performed, the data file in the Nth level whose key range overlaps minimally with the key ranges of the N+1th level may be selected to be compacted.

2) Adjacent data files of the Nth level (key ranges of adjacent data files are adjacent or order numbers of the adjacent data files are adjacent) and a certain data file of the N−1th level may participate in the same compaction, wherein the key range of each of the adjacent data files of the Nth level at least partially overlaps with the key range of the certain data file and, thus, remaining lifetimes of the adjacent data files of the N−1th level may be similar to a remaining lifetime of the certain data file. For example, the data file with a key range of 61-78 of the second level and three data files with key ranges of 51-63, 64-73 and 75-83 respectively of the third level may participate in the same compaction, so remaining lifetimes of the four data files may be more similar.

3) The lifetime of the data file of the upper level is longer than that of the data file of the lower level, and lifetimes of data files in the same level are similar.

Based on the above-mentioned lifetime relationship for data files, the lifetime of a created new data file may be predicted based on lifetime information of data files that have been created. For example, the lifetime information of the new data file may be predicted based on the lifetime information of files in a level where the new data file is located and the lifetime information of data files in a level adjacent to the level where the new data file is located in response to creation of a new data file in a level of the LSM-Tree, wherein the level adjacent to the level where the new data file is located may be at least one of an upper level adjacent to the level where the new data file is located and a lower level adjacent to the level where the new data file is located.

The method and device for data storage according to an exemplary embodiment of the present disclosure may reduce the number of pages that need to be migrated during GC by storing data files with similar expiration times in the same block set, thereby improving storage performance of a block storage device and increasing the lifetime of the block storage device.

The data storage method and device according to an exemplary embodiment of the present disclosure may be used in various data storage scenarios based on the LSM-Tree.

Figure 2:
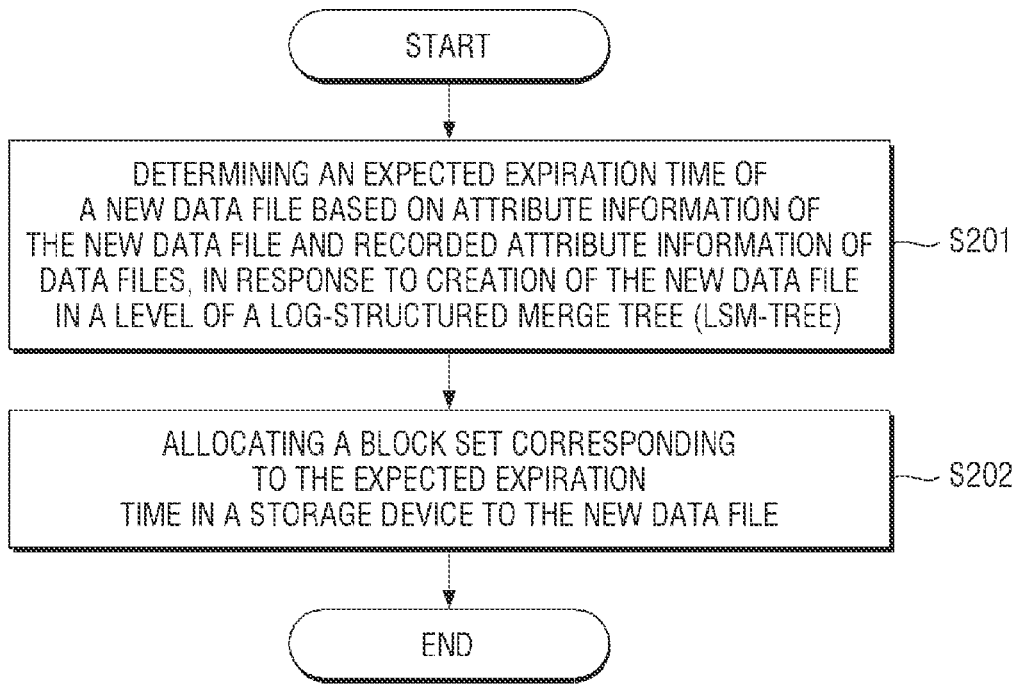
FIG. 2 is a flowchart illustrating a method for data storage according to an exemplary embodiment of the present disclosure.

FIG. 2 is a flowchart illustrating a method for data storage according to an exemplary embodiment of the present disclosure.

Referring to FIG. 2, in step S201, an expected expiration time of a new data file is determined based on attribute information of the new data file and recorded attribute information of data files, in response to creation of the new data file in a level of a log-structured merge tree (LSM-Tree). The recorded attribute information of the data files includes attribute information of data files that have been created in a level of the LSM-Tree. The attribute information indicates information of a level where each of the data files that has been created is located, key information of each of the data files, and lifetime information of each of the data files. The data files that have been created comprise unexpired data files or both unexpired data files, and expired data files that expired within a preset period before creation time of the new data file. The indicated lifetime information of an unexpired data file is represented by a creation time and an expected expiration time of the unexpired file, and the indicated lifetime information of an expired data file is represented by recorded lifetime information of the expired data file, or both a deletion time and a creation time of the expired data file.

Expired files are generated continuously from data files that have been created by an LSM-Tree during continuous operation of a system. The present disclosure may only use lifetime information of expired data files within a preset period of time that expired within a preset period before creation time of the new data file to predict the expected expiration time of the created new data file.

As an example, the recorded attribute information of the data files further indicates an order number of each of the data files in a level where the each of the data files is located and a key overlap rate between the data files and a data file of a level adjacent to the level where each is located.

As an example, information about creation, compaction, deletion, a level number, an order number in a level, a key range, etc. of a data file may be obtained from an LSM-Tree database application. For example, a creation time, the level number, the order number in a level, the key range, the key range overlap rate with data files of an adjacent level, etc. of the data file may be obtained when the data file is created and the obtained information may be recorded in a data file attribute table. The level number, the order number in the level, etc. of the data file may be continuously updated subsequently, and the compaction, the deletion, etc. of the data file may be recorded.

When a new data file is created, the recorded data files may include unexpired data files or may include expired data files within a preset time period and unexpired data files.

As an example, the lifetime information of expired data files and non-expired data files may also be recorded. Specifically, the lifetime information of the expired file or its creation time and deletion time may be recorded. The creation time and the expected expiration time of the unexpired data file may also be recorded.

The creation time of the unexpired data file may be a time when the data file is recorded in a Write Ahead Log (WAL), a time when the data file is written into the LSM-Tree, or a time when the data file is flashed into an SSD. Under certain circumstances, when determining the expected expiration time of a newly created data file, if there is no expected expiration time for a used unexpired data file, a preset value may be allocated as the expected expiration time of the used unexpired data file.

As an example, determining the expected expiration time of the new data file includes: (1) predicting lifetime information of the new data file based on at least one of first lifetime information, second lifetime information, and third lifetime information determined from the recorded attribute information of the data files and (2) determining the expected expiration time of the new data file based on a creation time of the new data file and the predicted lifetime information of the new data file. The first lifetime information is lifetime information of the expired data files of the level where the new data file is located, the second lifetime information is lifetime information of the unexpired data files of the level where the new data file is located, and the third lifetime information is lifetime information of the unexpired data files of a level above the level where the new data file is located.

As an example, at least one of an average value of the lifetimes of expired data files in a level where the new data file is located, an average value of the lifetimes of the unexpired data files in the level where the new data file is located, and an average value of the lifetimes of unexpired data files of an upper level of the level where the new data file is located may be calculated, and an average value of the at least one of the average values is taken as an expected lifetime of the created new data file, that is, the predicted lifetime information of the new data file. The expected expiration time of the new data file is the expected lifetime plus the creation time of the new data file. For example, an average value of both the average value of the lifetimes of the expired data files in a level where the new data file is located and the average value of the lifetimes of the unexpired data files in the level where the new data file is located may be used as the expected lifetime of the created new data file.

As another example, a weighted sum of the at least one average value may be used as the expected lifetime of the created new data file. A weight of each average value may be a preset value or determined according to a preset rule. For example, if an average lifetime of the expired data files of the level where the new data file is located is A1, an average lifetime of the unexpired data files of the level where the new data file is located is A2, and an average lifetime of the unexpired data files of an upper level of the level where the new data file is located is A3, the expected lifetime of the created new data file is w1*A1+w2*A2+w3*A3, where w1, w2, and w3 are preset weights respectively.

The manner of predicting the lifetime information of the new data file based on at least one of the first lifetime information, the second lifetime information, and the third lifetime information illustrated in this exemplary embodiment is only an example and does not limit the present disclosure.

As an example, determining the expected expiration time of the new data file includes: (1) predicting lifetime information of the new data file based on the first lifetime information and at least one of fourth lifetime information and fifth lifetime information determined from the recorded attribute information of the data files and (2) determining the expected expiration time of the new data file based on the creation time of the new data file and the predicted lifetime information of the new data file. The first lifetime information is lifetime information of the expired data files of the level where the new data file is located, the fourth lifetime information is lifetime information of the unexpired data files adjacent to the new data file in the level where the new data file is located, and the fifth lifetime information is lifetime information of the unexpired data files that are in a level adjacent to the level where the new data file is located and whose key information at least partially overlaps with key information of the new data file.

As an example, the average value of the lifetimes of the expired data files that are in the level where the new data file is located and at least one average value of the average value of the lifetimes of the unexpired data files adjacent to the new data file in the same level where the new data file is located and the average value of the lifetimes of the unexpired data files whose key information at least partially overlaps with key information of the new data file in the level adjacent to the level where the new data file is located may be determined. An average value of the average value of the lifetimes of expired data files in the level where the new data file is located and the at least one average value is used as the predicted lifetime of the new data file, and a sum of the creation time of the new data file and the predicted lifetime of the new data file is used as the expected expiration time of the new data file.

As an example, when the expected expiration time of the new data file is determined based on the first lifetime information and at least one of the fourth lifetime information and the fifth lifetime information, corresponding weight values are assigned to the first lifetime information, the fourth lifetime information, and the fifth lifetime information to calculate the expected lifetime information of the new data file.

As an example, a weighted averaging may be used to calculate the expected lifetime information of the new data file. For example, if the average value of the lifetimes of the adjacent unexpired data files in the level where the new data file is located is A4, the average value of the lifetimes of the unexpired data files that are in the level adjacent to the level where the new data file is located and whose key information at least partially overlaps with the key information of the new data file is A5, and the average value of the lifetimes of expired data files in the level where the new data file is located is A1, the expected lifetime of the created new data file may be $w1*A1+w4*A4+w5*A5$, where w1, w4, and w5 are preset weights respectively.

The unexpired data file adjacent to the new data file in the level where the new data file is located is an unexpired data file whose key is close to the key of the new data file or an unexpired data file whose order number is close to the order number of the new data file.

For example, referring to FIG. 1, the unexpired data file adjacent to the data file whose key range is 61-78 in the second level may be at least one of the data file whose key range is 3-16 and the data file whose key range is 81-92. The unexpired data file adjacent to the data file whose key range is 64-73 in the third level may be at least one of the data file whose key range is 51-63 and the data file whose key range is 75-83. The unexpired data file adjacent to the new data file in the level where the new data file is located may also be defined in other ways, for example, the unexpired data file adjacent to the data file whose key range is 64-73 in the third level may further include at least one of the data file whose key range is 85-95 and the data file whose key range is 26-40. That is, the unexpired data file adjacent to the new data file in the same level where the new data file is located may indicate an unexpired data file having a similar order number or key range to the new data file.

The expired data files of the level where the new data file is located may indicate the expired data files of the level where the new data file is located within a predetermined period of time.

The expected expiration time of the new data file is predicted by a statistical method above. As an example, a machine learning method (e.g., a linear regression-based method, a neural network-based method) may also be used to predict the expected expiration time of the new data file.

As an example, determining the expected expiration time of the new data file includes: (1) predicting lifetime information of the new data file by using a trained machine learning model based on at least one of first attribute information, second attribute information, and third attribute information and (2) determining the expected expiration time of the new data file based on a creation time of the new data file and the predicted lifetime information of the new data file. The first attribute information is attribute information of the expired data files of the level where the new data file is located and determined from the recorded attribute information. The second attribute information is attribute information of the unexpired data files adjacent to the new data file in the same level where the new data file is located. The third attribute information is attribute information of the unexpired data files that are in a level adjacent to the level where the new data file is located and whose key information at least partially overlaps with the key information of the new data file.

As an example, the lifetime of the new data file may be predicted by a trained machine learning model based on at least one of the first attribute information, the second attribute information, and the third attribute information. The expected expiration time of the new data file is obtained by adding the creation time of the new data file to the predicted lifetime of the new data file.

The adding operation may be performed as a part of operations of the machine learning model, so that an output of the trained machine learning model is indicative of the expected expiration time of the new data file.

The attribute information input to the trained machine learning model is consistent with training data used for training the machine learning model.

When the lifetime information or the expected expiration time of the new data file is predicted by using the trained machine learning model, if relevant data for predicting the lifetime information of the new data file is not sufficient (for example, there are no expired files of the level where the new data file is located, there is a lack of the unexpired data files adjacent to the new data file in the level where the new data file is located, there is a lack of the unexpired data files that are in the level adjacent to the level where the new data file is located and whose key information at least partially overlaps with the key information of the new data file, etc.), the missing relevant data may be a preset value or the lifetime information (or lifetime) of such new data file is set to be a preset value. For example, RocksDB provides an interface for obtaining the lifetime of the data file and the lifetime of the data file obtained through this interface may be used as the expected lifetime of the new data files in the absence of corresponding information, although it may not be highly accurate.

Referring back to FIG. 2, in step S202, a block set corresponding to the expected expiration time in a storage device is allocated to the new data file.

The storage device may be a Zone SSD or a Multistream SSD. Accordingly, the block set corresponding to the expected expiration time is a block set corresponding to a Zone ID or a block set corresponding to a stream ID. For example, a Zone ID is allocated to the new data file based on the expected expiration time and the Zone SSD stores the new data file in a zone corresponding to the allocated Zone ID based on the allocated Zone ID or a stream ID is allocated to the new data file based on the expected expiration time and the Multistream SSD stores the new data file in a block corresponding to the allocated stream ID based on the allocated stream ID.

As an example, allocating the storage block set, corresponding to the expected expiration time in the storage device, to the new data file includes: (1) determining a set of expected expiration time distances and (2) allocating a corresponding block set to the new data file based on the set of the expected expiration time distances. The set of the expected expiration time distances includes a distance between an expected expiration time of each block set that has been written but is not full of data and the expected expiration time of the new data file. And the distance between the expected expiration time of each block set and the expected expiration time of the new data file is obtained based on the expected expiration time of the new data file and an expected expiration time of an unexpired data file in each block set.

As an example, the distance between the expected expiration time of each block set and the expected expiration time of the new data file is an average value, a minimum value, or a maximum value of the distances between the expected expiration times of respective unexpired data files of each block set and the expected expiration time of the new data file.

As an example, allocating the corresponding block set to the new data file includes allocating the corresponding block set to the new data file based on the minimum distance in the set of the expected expiration time distances or based on the minimum distance in the set of the expected expiration time distances and a block set usage rate of the storage device. The block set usage rate is obtained based on the number of block sets, of the block storage device, that are not empty and the number of all block sets of the block storage device.

As an example, a storage block set corresponding to the smallest distance in the set of the expected expiration time distances may be allocated to the new data file. That is, the storage block set corresponding to the smallest distance in the set of the expected expiration time distances is the storage block set corresponding to the expected expiration time of the new data.

As an example, allocating the corresponding block set to the new data file based on the minimum distance in the set of the expected expiration time distances and the block set usage rate of the storage device includes: performing normalization on the minimum distance in the set of the expected expiration time distances, allocating a block set corresponding to the minimum distance to the new data file if the normalized minimum distance is not greater than the block set usage rate, and allocating an empty block set to the new data file if the normalized minimum distance is greater than the block set usage rate.

As an example, the minimum distance divided by the maximum distance in the set of the expected expiration time distances or an average of distances in the set of the expected expiration time distances may be taken as the normalized minimum distance.

Figure 3:
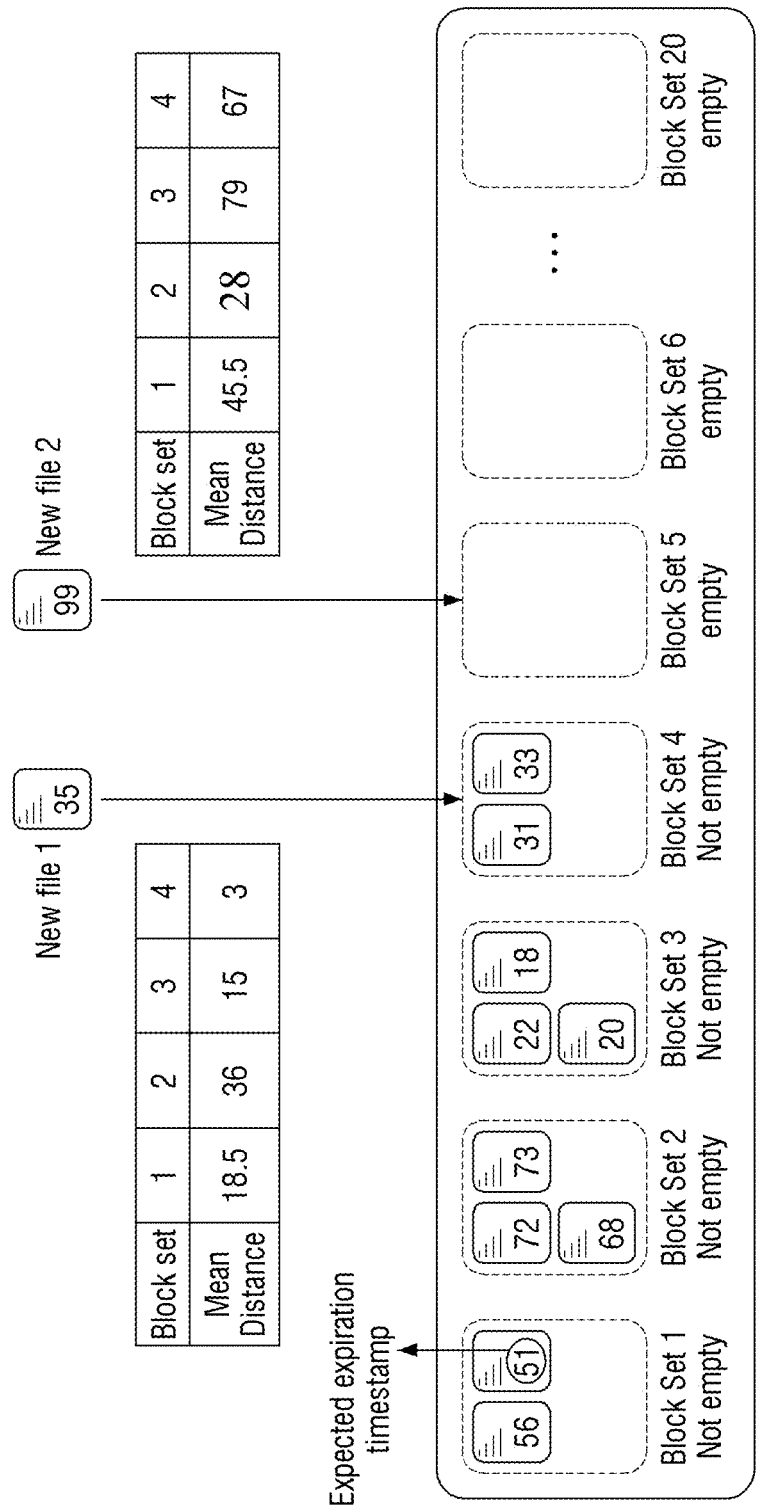
FIG. 3 is a diagram illustrating an example of allocating a block set to a new data file according to an expected expiration time of the new data file.

FIG. 3 is a diagram illustrating an example of allocating a block set to a new data file according to the expected expiration time of the new data file.

Referring to FIG. 3, a block storage device has 20 block sets in which the block sets 1-4 are non-empty block sets, so the block set usage rate is 0.2. For the new data file 1, its distances from the non-empty block sets 1-4 are 18.5, 36, 15, and 3, respectively. Therefore, the normalized minimum distance is 0.08. Since 0.08<0.2, the new data file 1 is allocated to block set 4. For the new data file 2, since the normalized minimum distance 0.35>0.2, the new data file is allocated to the empty block set 5.

Additionally, separated block set IDs may be allocated to files other than data files. A block set ID is stored in a virtual file system or attributes of a file corresponding to the virtual file system and is transferred to the SSD as file data is written, so that the file data is stored in a corresponding block set by the SSD (for example, a multi-stream SSD places data according to a stream ID or a ZNS SSD places data according to a zone ID).

According to the block set allocating strategy of the present disclosure, since data files with similar expected expiration times are placed in the same block set, the valid pages migrated during GC may be reduced, thereby reducing Write Amplification and improving the lifetime and performance of the storage device.

Figure 4:
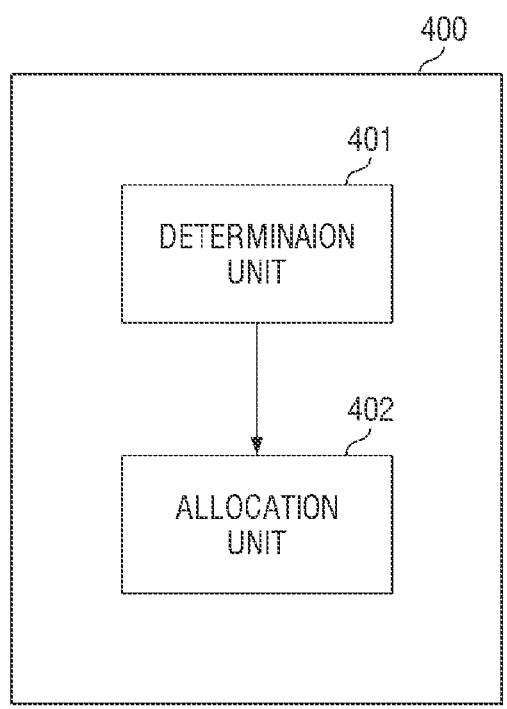
FIG. 4 illustrates a block diagram of a structure of a device for data storage according to an exemplary embodiment of the present disclosure.

The method for data storage according to an exemplary embodiment of the present disclosure has been described above with reference to FIGS. 1 to 3. A device for data storage, a data storage system, and a data storage device according to embodiments of the present disclosure will be described below with reference to FIGS. 4-9. FIG. 4 is a block diagram illustrating a structure of a device for data storage 400 according to an embodiment of the present disclosure.

Referring to FIG. 4, the device 400 for data storage includes a determination unit 401 and an allocation unit 402.

The device for data storage 400 may additionally include other components, and at least one of components in the device for data storage 400 may be divided or combined.

As an example, the determination unit 401 may be configured to determine an expected expiration time of a new data file based on attribute information of the new data file and recorded attribute information of data files, in response to creation of the new data file in a level of a log-structured merge tree (LSM-Tree). The recorded attribute information of the data files includes attribute information of data files that have been created in a level of the LSM-Tree. The attribute information indicates information of a level where each of the data files that have been created is located, key information of each of the data files, and lifetime information of each of the data files. The data files that have been created comprise unexpired data files or both unexpired data files, and expired data files that expired within a preset period before creation time of the new data file. The indicated lifetime information of an unexpired data file is represented by a creation time and an expected expiration time of the unexpired file. The indicated lifetime information of an expired data file is represented by recorded lifetime information of the expired data file and/or a deletion time and a creation time of the expired data file.

Figure 5:
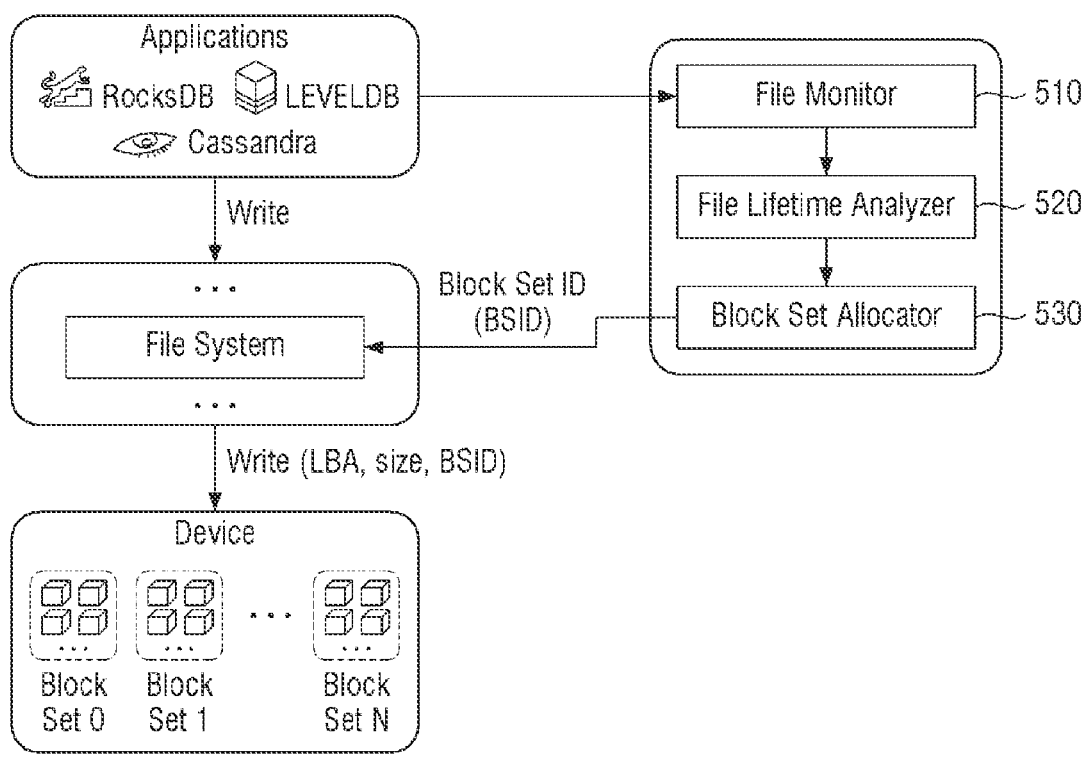
FIG. 5 is a schematic diagram illustrating an example of a process for storing data based on an LSM-Tree according to an exemplary embodiment of the present disclosure.

FIG. 5 is a schematic diagram illustrating an example of a process of storing data based on an LSM-Tree according to an exemplary embodiment of the present disclosure.

As an example, relevant attribute information of historical data files may be recorded by the file monitor 510 shown in FIG. 5, such as level information of an expired data file and an unexpired data file, key information of each data file, the lifetime information of each data file, etc. The expected expiration time of the new data file may be determined by a file lifetime analyzer 520 based on the recorded attribute information of data files and the attribute information of the new data file.

As an example, the allocation unit 402 may be configured to allocate, to the new data file, a block set corresponding to the expected expiration time in a storage device. As an example, a storage block set corresponding to the expected expiration time in the storage device may be allocated to the new data file through the block set allocator 530 in FIG. 5. For example, an ID of the storage block set corresponding to the expected expiration time may be allocated to the new data file through the block set allocator 530.

As an example, the recorded attribute information of the data files further indicates an order number of each of the data files in a level where each of the data files is located and a key overlap rate between each of the data files and a data file of an adjacent level.

As an example, the determination unit 401 may be configured to: (1) predict lifetime information of the new data file based on at least one of first lifetime information, second lifetime information, and third lifetime information determined from the recorded attribute information of the data files and (2) determine the expected expiration time of the new data file based on a creation time of the new data file and the predicted lifetime information of the new data file. The first lifetime information is lifetime information of the expired data files of the level where the new data file is located. The second lifetime information is lifetime information of the unexpired data files of the level where the new data file is located. The third lifetime information is lifetime information of the unexpired data files of a level above the level where the new data file is located.

As an example, the lifetime information of the new data file may be predicted and the expected expiration time of the new data file is determined based on the creation time of the new data file and the predicted lifetime information of the new data file by the file lifetime analyzer 520 shown in FIG. 5.

As an example, the determination unit 401 may be configured to: (1) predict lifetime information of the new data file based on first lifetime information and at least one of fourth lifetime information and fifth lifetime information determined from the recorded attribute information of the data files and (2) determine the expected expiration time of the new data file based on a creation time of the new data file and the predicted lifetime information of the new data file. The first lifetime information is lifetime information of the expired data files of the level where the new data file is located. The fourth lifetime information is lifetime information of the unexpired data files adjacent to the new data file in the level where the new data file is located. The fifth lifetime information is lifetime information of the unexpired data files that are in a level adjacent to the level where the new data file is located and whose key information at least partially overlaps with key information of the new data file.

As an example, the lifetime information of the new data file may be predicted and the expected expiration time of the new data file is determined based on the creation time of the new data file and the predicted lifetime information of the new data file by the file lifetime analyzer 520 shown in FIG. 5.

As an example, the determination unit 401 may be configured to: (1) predict lifetime information of the new data file by using a trained machine learning model based on at least one of first attribute information, second attribute information, and third attribute information and (2) determine the expected expiration time of the new data file based on a creation time of the new data file and the predicted lifetime information of the new data file. The first attribute information is attribute information of the expired data files of the level where the new data file is located determined from the recorded attribute information. The second attribute information is attribute information of the unexpired data files adjacent to the new data file in the level where the new data file is located. The third attribute information is attribute information of the unexpired data files that are in a level adjacent to the level where the new data file is located and whose key information at least partially overlaps with key information of the new data file. As an example, the lifetime information of the new data file may be predicted and the expected expiration time of the new data file is determined based on the creation time of the new data file and the predicted lifetime information of the new data file by the file lifetime analyzer 520 shown in FIG. 5.

As an example, the allocation unit 402 may be configured to determine a set of expected expiration time distances and allocate a corresponding block set to the new data file based on the set of the expected expiration time distances. The set of the expected expiration time distances includes a distance between an expected expiration time of each block set that has been written but is not full of data and the expected expiration time of the new data file. The distance between the expected expiration time of each block set and the expected expiration time of the new data file is obtained based on the expected expiration time of the new data file and an expected expiration time of an unexpired data file in each block set.

As an example, the allocation unit 402 may be configured to allocate the corresponding block set to the new data file based on a minimum distance in the set of the expected expiration time distances or based on a minimum distance in the set of the expected expiration time distances and a block set usage rate of the storage device. The block set usage rate is obtained based on the number of block sets, of the block storage device, that are not empty and the number of all block sets of the block storage device.

As an example, the allocation unit 402 may be configured to perform normalization on the minimum distance in the set of the expected expiration time distances, allocate a block set corresponding to the minimum distance to the new data file if the normalized minimum distance is not greater than the block set usage rate, and allocate an empty block set to the new data file if the normalized minimum distance is greater than the block set usage rate.

As an example, the set of the expected expiration time distances may be determined and a corresponding block set may be allocated to the new data file based on the set of the expected expiration time distances by the block set allocator 530 shown in FIG. 5

According to the device for data storage according to the exemplary embodiment of the present disclosure, since data files with similar expected expiration times are placed in the same block set, valid pages migrated during GC may be reduced, thereby reducing Write Amplification and improving the lifetime and performance of the storage device.

Figure 6:
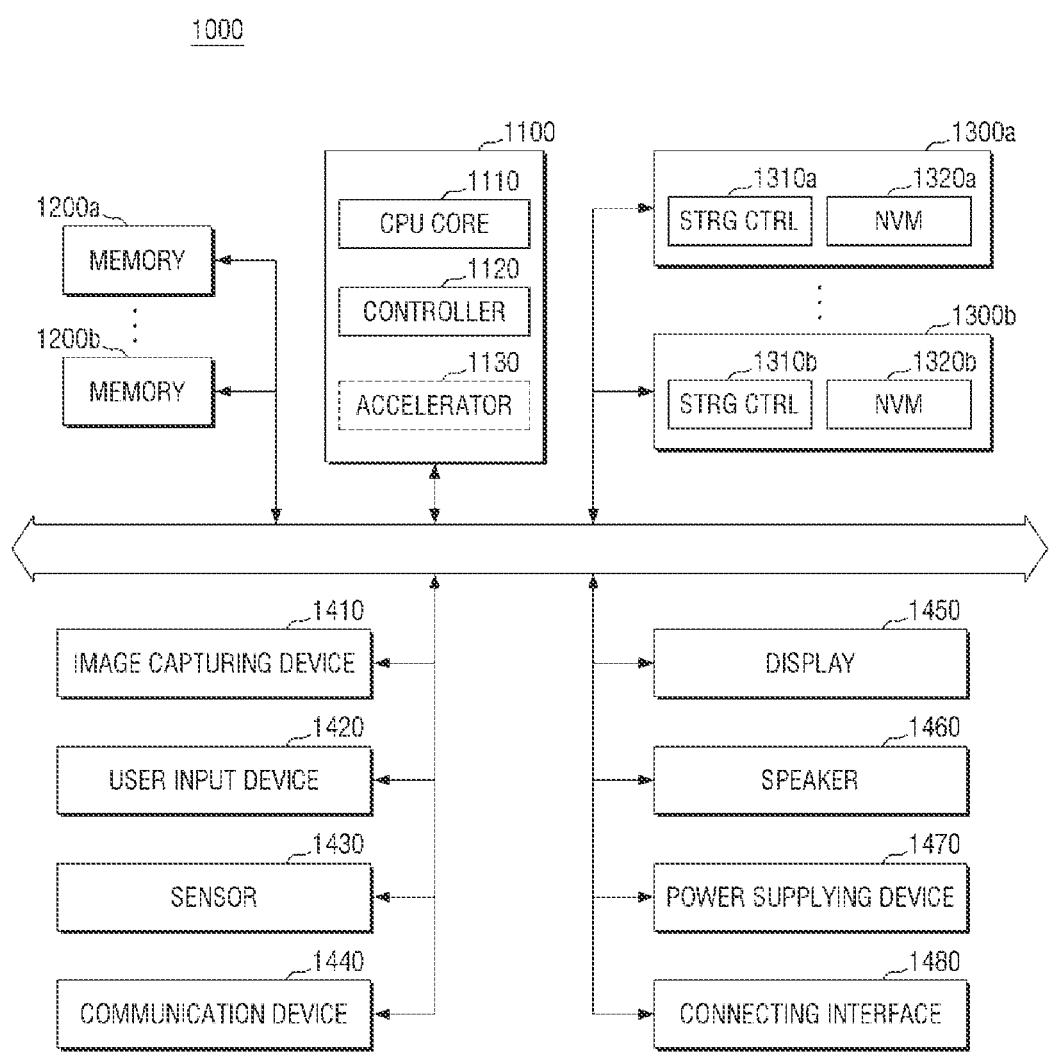
FIG. 6 is a schematic diagram of a system to which a storage device is applied, according to an embodiment of the present disclosure.

FIG. 6 is a schematic diagram of a system 1000 to which a storage device is applied according to an embodiment of the present disclosure.

The system 1000 of FIG. 6 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 6 is not necessarily limited to the mobile system and may be a PC, a laptop computer, a server, a media player, or an automotive device (e.g., a navigation device).

Referring to FIG. 6, the system 1000 may include a main processor 1100, memories (e.g., 1200a and 1200b), and storage devices (e.g., 1300a and 1300b). In addition, the system 1000 may 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU), and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as a static random access memory (SRAM) and/or dynamic RAM (DRAM), each of the memories 1200a and 1200b may include non-volatile memory, such as a flash memory, state-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto and have larger storage capacity than the memories 1200a and 1200b. The storage devices 1300a and 1300b may respectively include storage controllers (STRG CTRL) 1310a and 1310b and NVMs (Non-Volatile Memory) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 1000 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe) is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVMe, an IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

As an example, there is provided a system to which a storage device is applied, including: a main processor (for example, 1100), a memory (for example, 1200a and 1200b), and storage devices (for example, 1300a and 1300b). The memory stores a computer program for the main processor to perform the method for data storage as described above.

Figure 7:
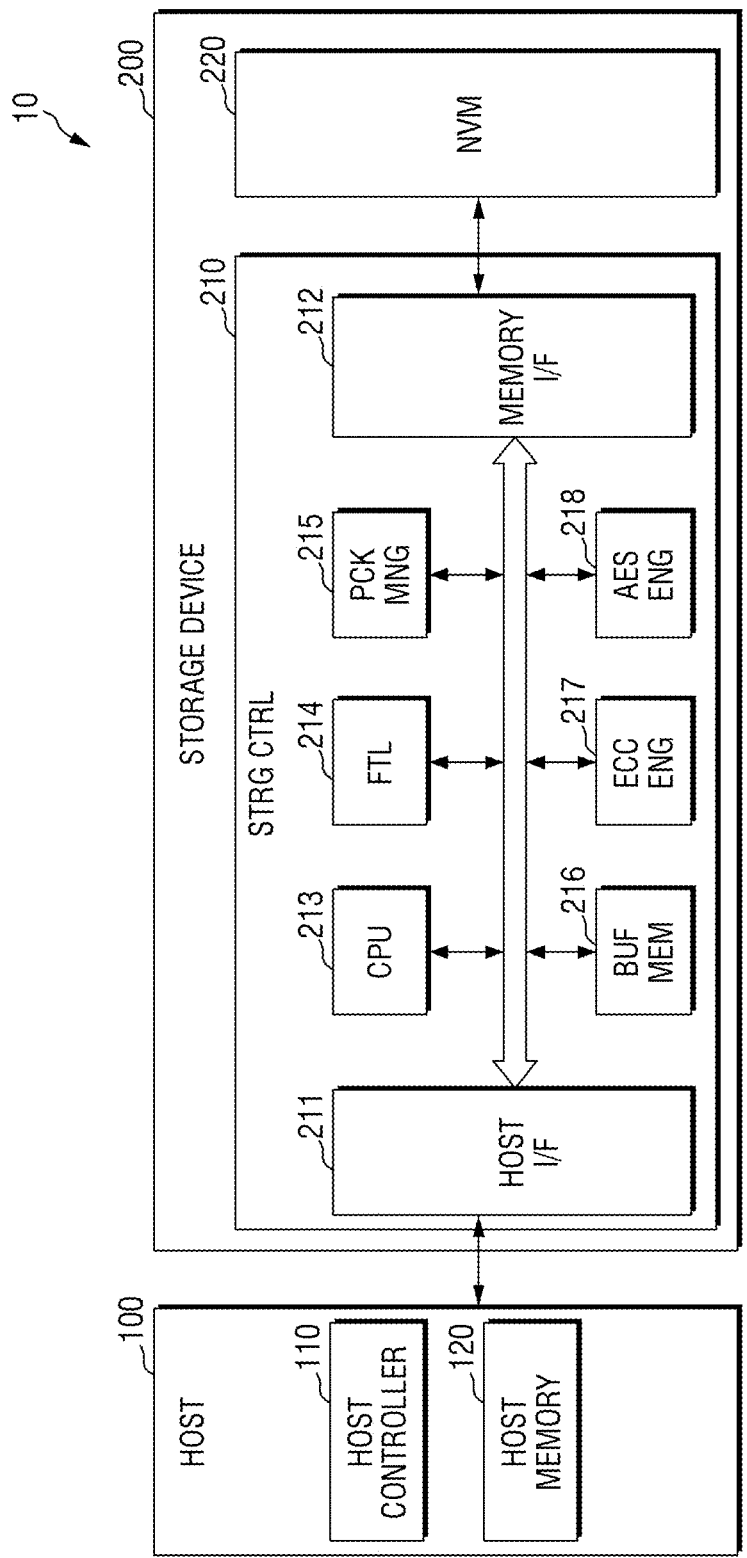
FIG. 7 is a block diagram of a host storage system according to an exemplary embodiment.

FIG. 7 is a block diagram of a host storage system 10 according to an embodiment of the present disclosure.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controller 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which conforms to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220 and the generated parity bits may be stored in the NVM 220 together with write data. During the reading of data from the NVM 220, the ECC engine 217 may correct an error in the read data by using the parity bits read from the NVM 220 along with the read data and output error-corrected read data.

The AES engine 218 may perform at least one of an encryption operation and a decryption operation on data input to the storage controllers 210 by using a symmetric-key algorithm.

According to an embodiment of the present disclosure, a host storage system is provided, including a host (for example, 100) and a storage device (for example, 200) supporting multi-streams. The host memory is configured to perform the method for data storage as described above.

Figure 8:
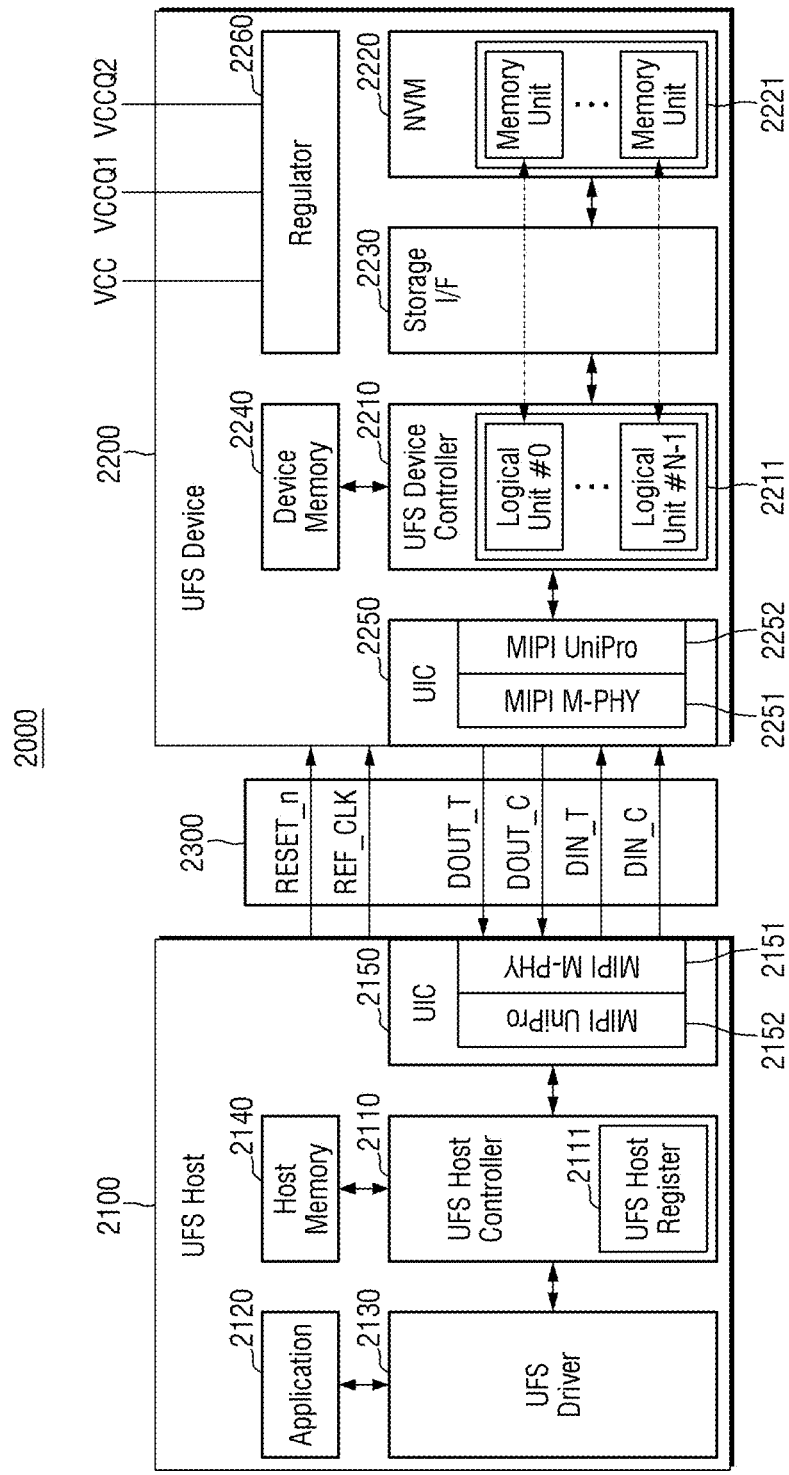
FIG. 8 is a block diagram of a UFS system according to an embodiment.

FIG. 8 is a block diagram of a UFS system 2000 according to an embodiment of the present disclosure.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 6 may also be applied to the UFS system 2000 of FIG. 8 within a range that does not conflict with the following description of FIG. 8.

Referring to FIG. 8, the UFS host 2100 may be connected to the UFS device 2200 through the UFS interface 2300. When the main processor 1100 of FIG. 6 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 6. The UFS device 2200 may correspond to the storage device 1300a and 1300b of FIG. 6, and a UFS device controller 2210 and an NVM 2220 may respectively correspond to the storage controllers 1310a and 1310b and the NVMs 1320a and 1320b of FIG. 6.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 8, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 8, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220 and the generated parity bits may be stored in the NVM 2220 along with the write data. During the reading of data from the NVM 2220, the ECC engine may correct an error in read data by using the parity bits read from the NVM 2220 along with the read data and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ1, and VCCQ2 may be applied as power supply voltages to the UFS device 2200. The voltage VCC may be a main power supply voltage for the UFS device 2200 and be in a range of 2.4 V to 3.6 V. The voltage VCCQ1 may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ1, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

According to an embodiment of the present disclosure, a UFS system is provided, including a UFS host (for example, 2100), a UFS device (for example, 2200), and a UFS interface (for example, 2300) used for a communication between the UFS device and the UFS host. The UFS host is configured to execute the method for data storage as described above.

Figure 9:
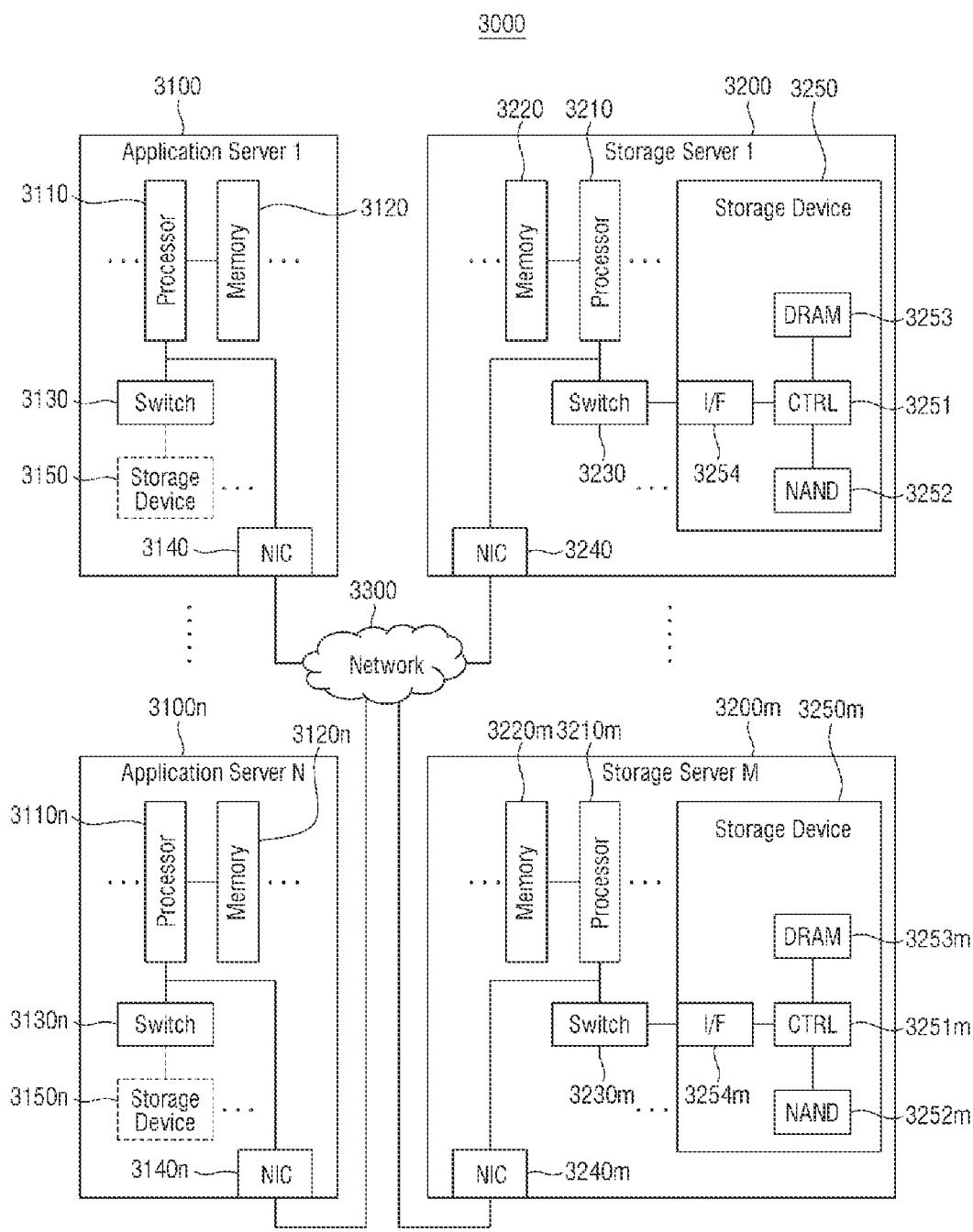
FIG. 9 is a diagram of a data center to which storage devices are applied according to an embodiment of the disclosure.

FIG. 9 is a diagram of a data center 3000 to which a storage device is applied according to an embodiment of the present disclosure.

Platform Portion—Server (Application/Storage)

Referring to FIG. 9, the data center 3000 may be a facility that collects various types of pieces of data and provides services and may be referred to as a data storage center. The data center 3000 may be a system for operating a search engine and a database and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), an Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

Platform Portion—Network

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300.

For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

Organic Relationship—Interface Structure/Type

The storage server 3200 will now be described as an example. An interface 3254 may 3254 may provide a physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, SCSI, SAS, PCI, PCIe, NVMe, IEEE 1394, USB interface, SD card interface, MMC interface, eMMC interface, UFS interface, eUFS interface, and/or CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210. A corresponding switch 3130 and NIC 3140 are disposed in application server 3100 to operate in a similar manner.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

Organic Relationship—Interface Operation

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal and, thus, the data may be output to a DQ bus. A data strobe signal DQS may be generated using the RE signal. The command and the address signal may be latched in a page buffer depending on a rising edge or falling edge of a write enable (WE) signal.

Product Portion—SSD Basic Operation

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

According to an embodiment of the present disclosure, a data center system (for example, 3000) is provided, including a plurality of application servers (for example, 3100-3100n) and a plurality of storage servers (for example, 3200-3200m). Each storage server includes a storage device, and at least one of the plurality of application servers and the plurality of storage servers is configured to perform the method for data storage as described above.

According to an embodiment of the present disclosure, there is provided a computer-readable storage medium storing a computer program, when executed by a processor, implementing the method for data storage as described above.

According to an embodiment of the present disclosure, there is provided an electronic apparatus, including a processor and a memory storing a computer program, when executed by the processor, implementing the method for data storage as described above.

According to an embodiment of the present disclosure, there may also be provided a computer-readable storage medium storing instructions, when executed by at least one processor, causing the at least one processor to execute the method for data storage according to the present disclosure. Examples of computer-readable storage media here include read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner and provide the computer programs and any associated data, data files, and data structures to the processor or the computer so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems so that computer programs and any associated data, data files, and data structures are stored, accessed, and executed in a distributed manner through one or more processors or computers.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as exemplary only and the actual scope and spirit of the present disclosure are pointed out by the following claims.

What is claimed is:

1. A method of storing a new data file that is assigned to a level of a Log-Structured Merge Tree (LSM-Tree), the method comprising:
    determining an expected expiration time of the new data file based on a level of the LSM-Tree to which the new data file is assigned and lifetime information of stored data files assigned to a same level or an immediately adjacent level of the LSM-Tree to which the new data file is assigned; and
    allocating, to the new data file, a block set corresponding to the expected expiration time among a plurality of non-volatile memory blocks in a storage device, wherein allocating the block set to the new data file comprises determining a set of expected expiration time distances and allocating the block set to the new data file based on the set of the expected expiration time distances.

2. The method of claim 1, wherein the expected expiration time of the new data file is based on:
    first lifetime information of expired data files assigned to the same level as the new data file,
    second lifetime information of unexpired data files assigned to the same level as the new data file, or
    third lifetime information of unexpired data files assigned to a level of the LSM-Tree that is immediately adjacent to the level to which the new data file is assigned.

3. The method of claim 2, wherein the expected expiration time of the new data file is further based on:
    fourth lifetime information of unexpired data files in the same level of the LSM-Tree to which the new data file is assigned, or
    fifth lifetime information of unexpired data files that are in the immediately adjacent level to which the new data file is assigned and whose key information has a range overlapping a range of key information of the new data file.

4. The method of claim 1, further comprising allocating, to the new data file, the block set based on a set of differences comprising a difference between the expected expiration time of the new data file and an expected expiration time of each block set that is only partially full of stored data.

5. The method of claim 4, further comprising allocating, to the new data file, the block set based on a minimum difference within the set of differences.

6. The method of claim 5, further comprising allocating, to the new data file, the block set based on both the minimum difference within the set of differences and a ratio of block sets within the storage device that are not empty to all block sets within the storage device.

7. The method of claim 6, further comprising allocating to the new data file:
    a block set whose expected expiration time has the minimum difference with respect to the expected expiration time of the new data file, if the minimum difference divided by a maximum difference, within the set of differences, is not greater than the ratio; and
    an empty block set if the minimum difference divided by the maximum difference is greater than the ratio.

8. The method of claim 6, further comprising allocating to the new data file:
    a block set whose expected expiration time has the minimum difference with respect to the expected expiration time of the new data file, if an average of the differences, within the set of differences, is not greater than the ratio; and
    an empty block set if the average of the differences is greater than the ratio.

9. A device for data storage comprising:
    a determination unit comprising one or more processors configured to determine an expected expiration time of a new data file based on a level of a Log-Structured Merge Tree (LSM-Tree) to which the new data file is assigned and lifetime information of stored data files assigned to a same level or an immediately adjacent level of the LSM-Tree to which the new data file is assigned; and
    an allocation unit comprising the one or more processors configured to allocate, to the new data file, a block set corresponding to the expected expiration time among a plurality of non-volatile memory blocks in a storage device, wherein allocation of the block set to the new data file comprises determining a set of expected expiration time distances and allocating the block set to the new data file based on the set of the expected expiration time distances.

10. The device of claim 9, wherein the expected expiration time of the new data file is based on:
first lifetime information of expired data files assigned to the same level as the new data file,
second lifetime information of unexpired data files assigned to the same level as the new data file, or
third lifetime information of unexpired data files assigned to a level of the LSM-Tree that is immediately adjacent to the level to which the new data file is assigned.

11. The device of claim 10, wherein the expected expiration time of the new data file is further based on:
fourth lifetime information of unexpired data files in the same level of the LSM-Tree to which the new data file is assigned, or
fifth lifetime information of unexpired data files that are in the immediately adjacent level to which the new data file is assigned and whose key information has a range overlapping a range of key information of the new data file.

12. The device of claim 9, wherein the allocation unit is further configured to allocate, to the new data file, the block set based on a set of differences comprising a difference between the expected expiration time of the new data file and an expected expiration time of each block set that is only partially full of stored data.

13. The device of claim 12, wherein the allocation unit is further configured to allocate, to the new data file, the block set based on a minimum difference within the set of differences.

14. The device of claim 13, wherein the allocation unit is further configured to allocate, to the new data file, the block set based on both the minimum difference within the set of differences and a ratio of block sets within the storage device that are not empty to all block sets within the storage device.

15. The device of claim 14, wherein the allocation unit is further configured to allocate to the new data file:
a block set whose expected expiration time has the minimum difference with respect to the expected expiration time of the new data file, if the minimum difference divided by a maximum difference, within the set of differences, is not greater than the ratio; and
an empty block set if the minimum difference divided by the maximum difference is greater than the ratio.

16. The device of claim 14, wherein the allocation unit is further configured to allocate to the new data file:
a block set whose expected expiration time has the minimum difference with respect to the expected expiration time of the new data file, if an average of the differences, within the set of differences, is not greater than the ratio; and
an empty block set if the average of the differences is greater than the ratio.

17. A non-transitory computer-readable storage medium storing a computer program that when executed by a processor implements a method for data storage, the method comprising:
determining an expected expiration time of a new data file based on a level of a Log-Structured Merge Tree (LSM-Tree) to which the new data file is assigned and lifetime information of stored data files assigned to a same level or an immediately adjacent level of the LSM-Tree to which the new data file is assigned; and
allocating, to the new data file, a block set corresponding to the expected expiration time among a plurality of non-volatile memory blocks in a storage device,
wherein allocating the block set to the new data file comprises determining a set of expected expiration time distances and allocating the block set to the new data file based on the set of the expected expiration time distances.

18. The non-transitory computer-readable storage medium of claim 17, wherein the expected expiration time of the new data file is based on:
first lifetime information of expired data files assigned to a same level as the new data file,
second lifetime information of unexpired data files assigned to the same level as the new data file, or
third lifetime information of unexpired data files assigned to a level of the LSM-Tree that is immediately adjacent to the level to which the new data file is assigned, or
fourth lifetime information of unexpired data files in the same level of the LSM-Tree to which the new data file is assigned, or
fifth lifetime information of unexpired data files that are in the immediately adjacent level to which the new data file is assigned and whose key information has a range overlapping a range of key information of the new data file.

19. The non-transitory computer-readable storage medium of claim 17, further comprising allocating, to the new data file, the block set based on a minimum difference within a set of differences comprising a difference between the expected expiration time of the new data file and an expected expiration time of each block set that is only partially full of stored data.

20. The non-transitory computer-readable storage medium of claim 19, further comprising allocating, to the new data file, the block set based on both the minimum difference within the set of differences and a ratio of block sets within the storage device that are not empty to all block sets within the storage device.

* * * * *